United States Patent [19]

Fischer et al.

[11] Patent Number: 4,487,059
[45] Date of Patent: Dec. 11, 1984

[54] CIRCUIT FOR PRODUCING PULSES INDICATIVE OF SPEED FROM A ROTARY GENERATOR WITHOUT TIMING SHIFT

[75] Inventors: Werner Fischer, Ditzingen; Helmut Kniss, Waiblingen; Johannes Locher, Stuttgart, all of Fed. Rep. of Germany

[73] Assignee: Robert Bosch GmbH, Stuttgart, Fed. Rep. of Germany

[21] Appl. No.: 504,474

[22] Filed: Jun. 15, 1983

[30] Foreign Application Priority Data

Jul. 13, 1982 [DE] Fed. Rep. of Germany ....... 3226073

[51] Int. Cl.³ .......................................... G01M 15/00
[52] U.S. Cl. ..................................... 73/116; 123/414
[58] Field of Search ...................... 73/116, 118, 117.3, 73/117.2; 324/167, 225; 318/314, 326; 336/110; 123/414

[56] References Cited

U.S. PATENT DOCUMENTS 3,328,681 6/1967 Wood .................................. 324/225

FOREIGN PATENT DOCUMENTS 2638616 8/1976 Fed. Rep. of Germany ...... 123/414

Primary Examiner—Jerry W. Myracle
Attorney, Agent, or Firm—Frishauf, Holtz, Goodman & Woodward

[57] ABSTRACT

The Schmitt trigger threshold switch which produces rectangular waves in response to the output of a rotary ignition timing generator has a variable bias applied to its switch-in threshold which is proportional to the amplitude of the generator output, while the switch-out threshold remains fixed at or near zero voltage. The bias, which may be developed by a peak detector, prevents inherent ignition timing shift as the generator turns faster. The Schmitt trigger utilizes an inverting comparator so that a "lowest-wins" circuit can be used for applying stabilizing negative feedback or bias to the comparator. The bias provides immunity to disturbing voltages which increase with signal amplitude.

6 Claims, 3 Drawing Figures

CIRCUIT FOR PRODUCING PULSES INDICATIVE OF SPEED FROM A ROTARY GENERATOR WITHOUT TIMING SHIFT

The invention concerns the generation of a signal sequence dependent on rotary speed from the periodic voltage of an inductive generator, in particular for controlling an internal combustion engine ignition system, in which the generator output is processed by a threshold stage.

It is known, especially in ignition systems for internal combustion engines, to utilize inductive tachogenerators that deliver voltages dependent upon speed. These voltages are then supplied to a threshold stage that in turn delivers a rectangular signal sequence of which the repetition rate represents speed. With the increase of speed, not only does the signal frequency increase, but normally also the amplitude of the voltage delivered by the generator. Consequently, with a constant threshold value of the threshold stage, the rotary angle at which the threshold value is overstepped is reached sooner with higher speed, because the wave or pulse signal of the inductive generator rises more rapidly. This has the effect that an ignition system timed by the system will have a so-called inherent timing shift.

THE INVENTION

It is an object of the present invention to provide a circuit for deriving rectangular waves from a rotary inductive timing generator which will not show an inherent timing shift with increase of rotary speed.

Briefly, means are provided for shifting the switch-in threshold of the threshold stage in response to amplitude changes of the signal while the switch-out threshold of the threshold stage remains fixed, preferably at zero.

The invention has the advantage that with various amplitudes of the generator voltage, the switch-in threshold of the threshold stage is always overstepped at the same rotary angle in the revolution of the timing generator. In consequence, inherent timing shift of the ignition system is avoided or greatly reduced. With the apparatus of the invention, the immunity to disturbance is improved, since in spite of the rise of the disturbance level with increasing rotary speed, the disturbance level still remains below the threshold as shifted in accordance with speed. It is particularly advantageous for the switch-out threshold to be zero and independent of speed, so that the rectangular signal sequence produced will also be independent of construction tolerances, eccentricity and similar properties of the rotary generator.

THE DRAWINGS

Further details of the invention are described by way of illustrative examples with reference to the annexed drawings, in which.

DESCRIPTION OF THE ILLUSTRATED EMBODIMENTS

Figure 1:
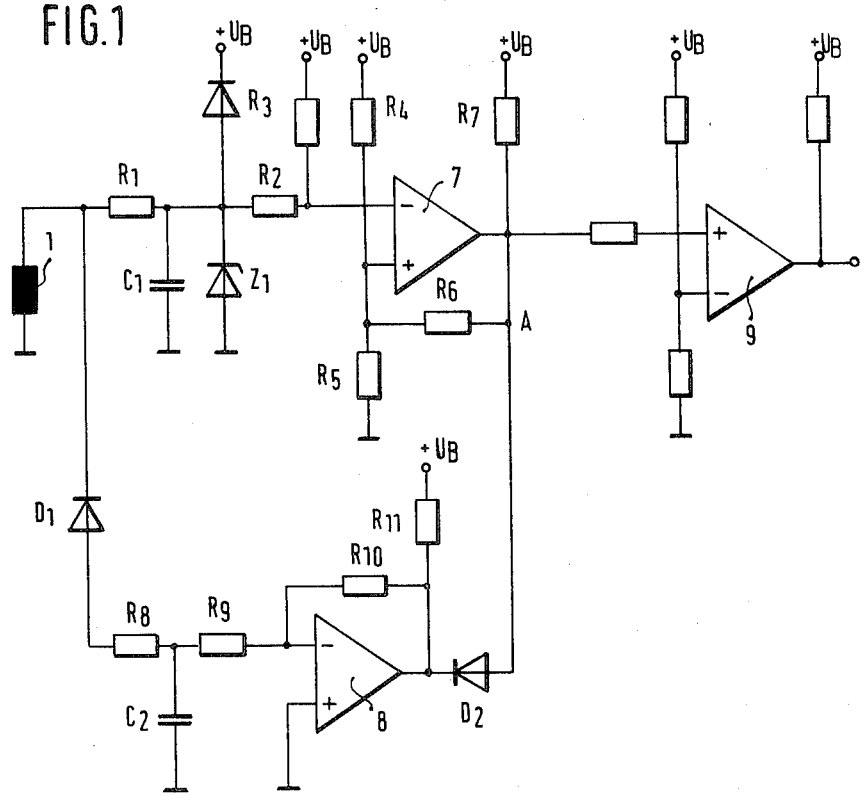
FIG. 1 is a circuit diagram of a first embodiment of the invention.

An inductive tachogenerator 1, typically connected with the crankshaft or cam shaft, in the example of a timing generator for an internal combustion engine, has its output connected over a low-pass filter R1,C1 to the cathode of a Zener diode Z1, which has its anode connected to chassis ground. The cathode of the Zener diode Z1 is connected through a resistor R2 with the inverting input of a comparator 7, which input is also connected through a resistor R3 to the positive d.c. power supply line. The tap of a voltage divider R4,R5 is connected to the non-inverting input of the comparator 7, which is also connected through a feedback resistor R6 to the output of the comparator. That output is also connected through a resistor R7 to the positive d.c. power supply. The circuit just described is in effect a Schmitt trigger circuit.

The generator 1 has its ungrounded terminal connected, not only to the low-pass filter R1,C1, but also to the cathode of a diode D1, the anode of which is connected to a low-pass filter R8,C2. The output of the latter is connected through a resistor R9 to the inverting input of an amplifier 8, where a feedback resistor R10 is connected to the output of the amplifier 8. The non-inverting input of the amplifier 8 is grounded. The output of the amplifier 8 is connected to the cathode of a diode D2, the anode of which is connected with the output of the comparator 7 and with the feedback resistor R6. The output of the comparator 7 is also connected to another comparator 9.

Figure 2:
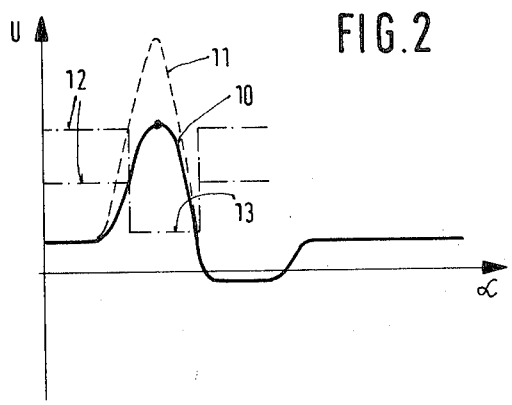
FIG. 2 is a graph of input signals of the threshold stage as a function of rotary angle.

The manner of operation of the circuit shown in FIG. 1 is best explained with reference to the diagram given in FIG. 2. An alternating voltage dependent on rotary speed is generated by the inductive generator 1. This voltage is passed through the low-pass filter R1,C1, in order to eliminate high-frequency interference. The Zener diode Z1 limits the negative peaks of the alternating voltage signal, and the resistors R2,R3 shift the signal thus processed in the direction of positive voltage values. The signal that is applied to the inverting input of the comparator 7 is shown in FIG. 2 for two different speeds as a function of rotary angle of revolution of the rotor of the generator. The switch-in and switch-out thresholds are set with the assistance of the resistors R4,R5 and R6, with the resistor R6 setting the switch-in voltage at a higher potential than the switch-out voltage. In consequence, disturbing signals having an amplitude smaller than the switch-in threshold are suppressed.

Since both the generator voltage and the disturbance voltages increase proportionally with speed, as the input signal increases the switch-on threshold should be raised. For this purpose, a signal dependent upon amplitude and thereby also on speed is obtained by means of the diode D1, the low-pass filter R8,C2 and the amplifier 8. The diode D1 conducts the negative half waves of the speed signal and feeds them into the low-pass filter R8,C2, which has a very large time constant. Thus a negative signal similar to a d.c. voltage is supplied to the amplifier 8, which operates as an inverting amplifier, so that at its output a positive signal simulating a d.c. voltage is present. The comparator 7 and the amplifier 8 each have, as an output stage, a transistor which has its emitter connected to ground. The collectors are connected together through the diode D2 that serves merely for temperature compensation, while the resistor R7 provides a common collector load. This circuit is known as a "lowest-wins" circuit, because it operates so that whichever transistor has the lowest potential applied to it takes over. Therefore, if the comparator 7 is in the "high" condition, the signal 12 takes over which is obtained from the rectifier branch and is a speed-dependent signal similar to a d.c. voltage. When the comparator 7 switches into the "low" condition, its potential lies lower than the speed signal that resembles a d.c. voltage, so that the low signal is applied at point A. The potential A is determinative of the threshold value applied to the noninverting input of the comparator 7. This threshold value (switch-on and switch-out thresholds) is represented by dot-and-dash lines 12 in FIG. 2 for two different speeds. From FIG. 2 it will be seen that the switch-out threshold 13 is constant and independent of speed.

Since the amplitude of the output difference between the two states of the comparator 7 depends on speed, another comparator 9 is provided for converting that output into steps of constant magnitude at its output.

Figure 3:
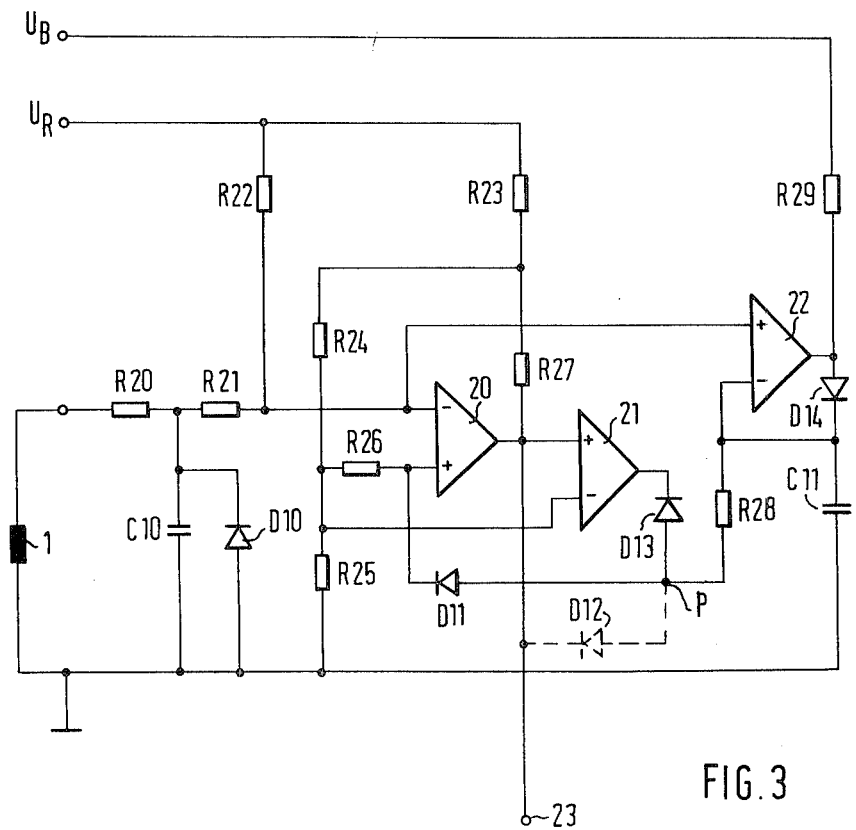
FIG. 3 is a circuit diagram of a second embodiment of apparatus according to the invention.

In FIG. 3, the inductive tachogenerator is again designated 1. Its output is connected to two input terminals, of which one is connected to ground. A resistance R20 and a capacitor C10 are connected in series between the generator terminals. The capacitor C10 is bridged by a diode D10. A resistance R21 is connected at one end to the common connection of the resistor R20 and the capacitor C10 and at the other end both to the inverting input of a comparator 20 and to a resistor R22, the other end of which is connected to a reference voltage $U_R$.

The non-inverting input of the comparator 20 is connected through a voltage divider R26,R24,R23 to the reference voltage $U_R$. A resistance R25 is connected between ground and the common connection of resistors R26 and R24. The output of the comparator 20 on the one hand provides the output of the circuit at the terminal 23 and on the other hand is connected to the non-inverting input of a further comparator 21 and also over a resistor R27 to the resistor R23. The inverting input of the comparator 21 is connected to the common connection of the resistors R25 and R26. The output of the comparator 21 is connected through a diode D13 with a circuit point P. The circuit point P is connected through another diode D11 to the non-inverting input of the comparator 20, but it is shown in the drawing by a broken line circuit that as an alternative, instead of providing the comparator 21 and the diode D13, there could be provided the diode D12 between the point P and the output of the comparator 20. The circuit point P is also connected to a resistor R28 which leads to the inverting input of a third comparator 22, which has its non-inverting input connected with the inverting input of the comparator 20. The output of the third comparator 22 is connected, on one hand, through a resistor R29 to the d.c. supply voltage $U_B$ and, on the other hand, through the series circuit composed of the diode D14 and a capacitor C11 to ground. The common connection of the diode D14 and the capacitor C11 is also connected directly to the inverting input of the comparator 22.

The manner of operation of the circuit shown in FIG. 3 is as follows.

The output signal of the generator 1 is filtered in the low-pass filter R20,C10, with the diode D10 serving to limit negative amplitudes of the generator signal. The effect of the resistances R21 and R22 and the polarity of the diode 010 is that the potential at the common connection of the resistors R21 and R22 cannot be negative, so that the comparator 20 can be maintained in its common mode region of operation. If the signal at the output of the low-pass filter R20,C10 exceeds a certain positive value, the comparator 20 switches off. The voltage divider R23,R24,R25 is so dimensioned that the voltage at the common connection of R24 and R25 is only slightly higher than the voltage at the inverting input of the comparator 20 when the generator voltage is equal to zero. When the input voltage thereafter rises, the comparator 20 switches over when the slight value just mentioned is overstepped. The potential at the connection point of R24 and R25 now depends on the dimensioning of the resistors R23,R24,R25 and R27, and the aforesaid potential preferably is set to be the same as the input potential of the comparator 20 when the input voltage is zero volts. Then the comparator 20 switches back when the value zero is again crossed (understepped this time).

The above outline of events applies only for the case in which the input signal from the generator 1 is relatively small. In other cases the remaining circuit components are put into play to prevent an inherent timing shift, and they operate as follows.

The additional comparator 22, together with the resistor 29, the diode 14 and the capacitor C11 serve as a so-called peak value detector that rectifies the input signal. The capacitor C11 is charged up to the maximum value of the voltage applied to the inverting input of the comparator. The switching threshold of the comparator 20 is then set through the voltage divider R28,R26 and the diode D11 in accordance with the detected peak value. The resistors R28 and R26 serve at the same time as discharge resistances for the capacitor C11.

After the comparator 20 switches on, the anode potential of the diode D13 is clamped with respect to the zero point through the additional comparator 21 and the diode D13 itself. In a modified form of the invention, this can take place directly over the diode D12 instead of through the comparator 21 and the diode D13. The anode potential of the diode D13 is always smaller than the potential at the connection point of the resistors R24 and R25, so that the diode D11 blocks and the potential at the non-inverting input of the comparator 20 corresponds to the potential at the connection point of the resistors R24 and R25. Since the latter potential, as mentioned above, has been made to be zero by the dimensioning of the corresponding resistances, the switching of the comparator 20 back to its original state is always constrained to take place at the value zero, so that independently of the compensation for the inherent timing shift by means of the peak value detected, the switching back of the comparator 20 always takes place at the same potential, preferably the potential value zero.

Although the invention has been described with reference to illustrative examples, it will be understood that further variations and modifications are possible within the inventive concept.

We claim:

1. Apparatus for producing, from the output of an inductive generator, a sequence of electric signals of substantially rectangular time profile which is representative of rotary speed, comprising a threshold switch stage having its input connected to receive signals from said generator, said threshold switch stage having switch-in and switch-out thresholds, and further comprising:

means for applying, to said threshold switch stage, a bias proportional to the amplitude of the signals received from said generator for progressively raising said switch-in threshold while leaving said switch-out threshold fixed.

2. Apparatus according to claim 1, in which said threshold switch stage is constituted as an inverting Schmitt trigger stage containing a comparator (7,20) connected to a negative feedback resistance (R6,R27,R24,R26) which is connected in a lowest-wins circuit for making effective the lowest of the potential of the upward of said Schmitt trigger stage and the output of said bias applying means (8).

3. Apparatus according to claim 2, in which said bias applying means comprises filtering and rectifier means (D1,R8,C2,8; R29,22,D14,C11) interposed between said generator and a connection of said lowest-wins circuit.

4. Apparatus according to claim 3, in which said rectifying and filtering means (D1,R8,C2,8) and said comparator (7) each have a final stage having an open collector, and in which said lowest-wins circuit is provided by connecting said open collectors with each other.

5. Apparatus according to claim 3, in which a series connection of a resistor (R38) and the diode (D11) is provided through which said rectifying and filtering means (R29,22,D14,C11) are connected with the non-inverting input of said comparator (20), and in which an additional diode (D12) is interposed between the common connection of said resistance (R28) and said diode (D11) and the output of said comparator (20).

6. Apparatus according to claim 3, in which a series connection of a resistor (R38) and the diode (D11) is provided through which said rectifying and filtering means (R29,22,D14,C11) are connected with the non-inverting input of said comparator (20), and in which an additional comparator (21) and an additional diode (D13) are interposed in circuit between the common connection of said resistance (R28) and said diode (D11), and the output of said comparator (20).

* * * * *